3,079,445
PRODUCTION OF CHLOROPRENE
Robert P. Arganbright, Galveston, Tex., assignor to Monsanto Chemical Company, St. Louis, Mo., a corporation of Delaware
No Drawing. Filed Jan. 4, 1960, Ser. No. 32
8 Claims. (Cl. 260—655)

The present invention relates to the preparation of chloroprene and, more particularly, it relates to an improved process for the production of chloroprene from dichlorobutanes.

It is well known that chloroprene is a highly valuable chemical intermediate. It can be polymerized in the presence of light, heat, or polymerization catalysts under various conditions to yield different rubber-like products. Because the synthetic rubber products produced from chloroprene are superior in some respects to ordinary rubber, there is a great commercial demand for this compound.

Present processes for the preparation of chloroprene starting from dichlorobutanes are multistage operations wherein the dichlorobutane must first be converted to the chlorobutene either by the action of an alkali or by thermal or catalytic pyrolysis. The unsaturated chlorinated product is then subjected to further chlorination after which either the resulting mixture or selected fractions thereof are dehydrochlorinated to obtain chloroprene. There are certain obvious disadvantages in some of the steps of such processes. In alkali dehydrochlorination, for example, considerable quantities of reagents are consumed and frequantly other less desired products than the monochlorinated butadiene predominate in the end product. In the pyrolysis steps, too, reaction conditions must be carefully controlled to avoid substantial decomposition to tar and/or carbon and yields are not as high as desired. The major disadvantage of the known processes is, of course, the number of separate operations required which necessitates the use of different apparatus, different catalysts, different reaction conditions, etc., in any commercial plant. Thus, the advantage of a process wherein conversion of a dichlorobutane directly to chloroprene could be effected in a single operation with high yields and high selectivity are immediately obvious.

It is an object of the present invention to provide an improved process for the production of chloroprene from dichlorobutanes in a one-step reaction with yields which are superior to those of the art processes and comparatively little loss to non-useful by-products. Other objects and advantages of the invention will become apparent from the following description thereof.

According to the invention, either 2,3-dichlorobutane or 2,2-dichlorobutane, hydrogen chloride, and oxygen are contacted at an elevated temperature with a catalyst consisting of magnesium chloride supported upon pumice to produce an effluent gas mixture from which chloroprene can be readily recovered in good yield.

The invention is illustrated in the following example which, however, is not to be construed as limiting it in any manner whatsoever.

*Example 1*

A tubular glass reactor about 4 ft. long and 40 mm. in diameter wrapped with Nichrome wire for heating and covered with asbestos insulation was employed as the reactor. A thermowell containing a thermocouple for measuring temperatures was centrally positioned in the reactor extending throughout its length. The catalyst consisting of magnesium chloride supported upon pumice was charged to the reactor and fluidized by passing nitrogen up through it while the reactor was brought up to reaction temperature. Thereafter, 2,3-dichlorobutane, hydrogen chloride, and air at approximate rates of 1.9 ml. (liquid) per min., 400 ml. per min. and 1000 ml. per min., respectively, were passed successively through rotameters into a mixer and preheater (~300° C.) and then into the reactor where they were contacted with the fluidized catalyst (about 300 ml.) maintained at a temperature within the range from about 450° C. to 480° C. As the reactants were introduced, the flow of nitrogen was proportionately reduced so that the velocity of the entering gaseous reactants helped to maintain the catalyst in the fluidized state. A total of about 34.2 ml. of 2,3-dichlorobutane was fed over a reaction period of about 20 minutes.

Effluent gases from the top of the reactor were passed through a separator filled with glass wool for removal of any entrained catalyst particles and thence into a series of Dry Ice traps and finally through a caustic scrubber for removal of unreacted HCl. Off-gas from the scrubber was vented through a wet-test meter.

The liquid organic product recovered from the Dry Ice traps as analyzed by gas chromatographic means contained 23.2% chloroprene, 36.8% 2-chlorobutenes, 28.8% unreacted 2,3-dichlorobutane and 10.5% butadiene-1,3. The estimated yield of chloroprene assuming chlorobutene to be a chloroprene precursor was 70%.

*Example 2*

The experiment of Example 1 is repeated except that 2,2-dichlorobutane is fed with the hydrogen chloride and oxygen instead of 2,3-dichlorobutane. The liquid organic product recovered contains approximately the same amount of chloroprene and the calculated yield is comparable to that obtained in Example 1.

Variations in conditions from those given in the example may be made without departing from the scope of the invention. The reaction may be carried out by mixing the dichlorobutane with hydrogen chloride and air or oxygen and passing the mixture in contact with the catalyst in a heated reaction chamber; or if desired, the mixture may be introduced into the reaction zone in three separate streams; or the air or oxygen may be introduced into a mixture of the dichlorobutane and hydrogen chloride.

In the preferred embodiment of the invention, the catalyst is employed in the fluidized or pseudo liquid state. It is maintained in a fluid or suspended state by the gaseous reactants themselves or optionally, by the use of an additional inert gas introduced from an outside source. The use of a fixed bed operation, however, is not outside the scope of the invention.

The relative proportions of the reactants may vary considerably. Preferred proportions are those corresponding to the stoichiometric amounts required to chlorinate 2-chlorobutene which is a dehydrochlorination product of dichlorobutane, that is, a 1:1:0.5 ratio of dichlorobutane to hydrogen chloride to oxygen or 1:1:2.5 if air is used instead of oxygen. Since hydrogen chloride is not consumed in the reaction, only very small amounts, if any, of this reactant need be fed after the reaction is initiated if provision is made for recycle of the hydrogen chloride. In fact, the reaction can actually be carried out without feeding hydrogen chloride, i.e., by bringing only the dichlorobutane and oxygen into contact with the catalyst. When this technique is employed, however, the yield of chloroprene is significantly lower and a considerably larger proportion of butadiene appears in the product together with more carbon dioxide produced probably by oxidation of butadiene. Hence, in the preferred method of operation, hydrogen chloride is charged with the dichlorinated butane and oxygen. Slight excesses of the dichlorobutane and oxygen or air may be employed if desired without significantly affecting the reaction. The 2-chlorobutenes produced as a by-product together with unreacted dichlorobutane can be recycled after separation from the reaction mixture to produce more chloroprene.

Contact time does not appear to be critical and may vary from about 0.5 second to about 12 seconds.

Reaction temperature is a critical factor and the temperature must be maintained above about 450° C. to effect the reaction. Preferably, the temperature is maintained in the range from 480° C. to 520° C. Although temperatures above 520° C. and up to 600° C. can be employed, some carbon begins to deposit on the catalyst at these higher temperatures.

The catalyst for the process is readily prepared by saturating pumice with a solution, aqueous or otherwise, of magnesium chloride and filtering and drying the impregnated pumice. Further drying may be effected by means of a flow of nitrogen (or other inert gas), hydrogen chloride and/or air through the mass of catalyst while it is being heated to reaction temperature after it has been charged to the reactor. A more active catalyst is prepared from a methanolic solution of magnesium chloride. Better catalytic activity has also been observed for a catalyst prepared and dried under vacuum. The catalyst may be readily regenerated by heating with air at a temperature of about 500° C. to "burn off" any deposited carbon from its surface.

What is claimed is:
1. A process for the production of chloroprene which comprises reacting a dichlorobutane chosen from the group consisting of 2,3-dichlorobutane and 2,2-dichlorobutane with hydrogen chloride and oxygen in the presence of a catalyst consisting essentially of magnesium chloride supported upon pumice at a temperature above about 450° C.

2. A process for the production of chloroprene which comprises reacting a dichlorobutane chosen from the group consisting of 2,3-dichlorobutane and 2,2-dichlorobutane with hydrogen chloride and oxygen in the presence of a catalyst consisting essentially of magnesium chloride supported upon pumice at a temperature in the range from about 450° C. to about 520° C.

3. A process for the production of chloroprene which comprises reacting 2,3-dichlorobutane with hydrogen chloride and oxygen in the presence of a catalyst consisting essentially of magnesium chloride supported upon pumice at a temperature above about 450° C.

4. A process for the production of chloroprene which comprises reacting 2,3-dichlorobutane with hydrogen chloride and oxygen in the presence of a catalyst consisting essentially of magnesium chloride supported upon pumice at a temperature in the range from about 450° C. to about 520° C.

5. A process for the production of chloroprene which comprises reacting 2,3-dichlorobutane with hydrogen chloride and oxygen in the molecular ratio of 1:1:0.5 at a temperature in the range from about 450° C. to about 520° C. in the presence of a catalyst consisting essentially of magnesium chloride supported upon pumice.

6. A process for the production of chloroprene which comprises reacting 2,2-dichlorobutane with hydrogen chloride and oxygen in the presence of a catalyst consisting of magnesium chloride supported upon pumice at a temperature above about 450° C.

7. A process for the production of chloroprene which comprises reacting 2,2-dichlorobutane with hydrogen chloride and oxygen in the presence of a catalyst consisting essentially of magnesium chloride supported upon pumice at a temperature in the range from about 450° C. to about 520° C.

8. A process for the production of chloroprene which comprises reacting 2,2-dichlorobutane with hydrogen chloride and oxygen in the molecular ratio of 1:1:0.5 at a temperature in the range from about 450° C. to about 520° C. in the presence of a catalyst consisting essentially of magnesium chloride supported upon pumice.

References Cited in the file of this patent

UNITED STATES PATENTS

| | | |
|---|---|---|
| 2,281,096 | Engs et al. | Apr. 28, 1942 |
| 2,308,489 | Cass | Jan. 19, 1943 |
| 2,395,314 | Blumer | Feb. 19, 1946 |
| 2,602,021 | Belchetz | July 1, 1952 |
| 2,803,679 | Conrad | Aug. 20, 1957 |

FOREIGN PATENTS

| | | |
|---|---|---|
| 108,421 | Austria | Dec. 27, 1927 |
| 535,585 | Great Britain | Apr. 15, 1941 |